United States Patent
Sohara (10) Patent No.: US 7,208,997 B2
(45) Date of Patent: Apr. 24, 2007

(54) CHARGE PUMP POWER SUPPLY CIRCUIT

(75) Inventor: Yasuyuki Sohara, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 22 days.

(21) Appl. No.: 11/143,572

(22) Filed: Jun. 3, 2005

(65) Prior Publication Data

US 2005/0270086 A1    Dec. 8, 2005

(30) Foreign Application Priority Data

Jun. 4, 2004    (JP) .............................. 2004-167670

(51) Int. Cl.
 *H02M 3/18*    (2006.01)
(52) U.S. Cl. ........................ 327/536; 363/60
(58) Field of Classification Search ................ 327/536, 327/537; 363/59, 60; 307/110
See application file for complete search history.

(56) References Cited

U.S. PATENT DOCUMENTS

| | | | |
|---|---|---|---|
| 6,278,318 B1 * | 8/2001 | Watanabe | 327/536 |
| 6,411,531 B1 * | 6/2002 | Nork et al. | 363/60 |
| 6,657,875 B1 * | 12/2003 | Zeng et al. | 363/59 |
| 6,738,271 B2 * | 5/2004 | Umeda | 363/60 |
| 2006/0114053 A1 * | 6/2006 | Sohara et al. | 327/536 |

FOREIGN PATENT DOCUMENTS

| | | |
|---|---|---|
| JP | 10-14218 | 1/1998 |
| JP | 2003-18822 | 1/2003 |
| JP | 2003-219634 | 7/2003 |
| JP | 2003-235244 | 8/2003 |

\* cited by examiner

*Primary Examiner*—Timothy P. Callahan
*Assistant Examiner*—Terry L. Englund
(74) *Attorney, Agent, or Firm*—McDermott Will & Emery LLP (57) ABSTRACT

In a basic circuit of a booster circuit, two charging units perform a charging operation and two boosting units perform a boosting operation (discharging operation). One of the charging units is connected to a voltage input and the other is connected to a voltage output. The charging unit that is connected to the voltage input includes three parallel connected MOS transistors Q11, Q12, and Q13, the other charging unit includes a MOS transistor Q4. One of the boosting units is connected to the voltage input and the other is connected to the voltage output. The boosting unit that is connected to the voltage input includes three parallel connected MOS transistors Q31, Q32, and Q33, the other boosting unit includes a MOS transistor Q2. Q11 and Q31 are turned ON immediately after start up, then Q12 and Q32 are turned ON and finally Q13 and Q33 are turned ON.

9 Claims, 10 Drawing Sheets

CHARGE PUMP POWER SUPPLY CIRCUIT

BACKGROUND OF THE INVENTION

1) Field of the Invention

The present invention relates to a charge pump power supply circuit that generates voltage by charging and discharging a capacitor.

2) Description of the Related Art

A booster circuit and an inverter circuit are used in charge pump power supply circuits. The booster circuit boosts up an input voltage and the inverting circuit inverts the boosted voltage and outputs the inverted voltage. Generally, MOS (metal-oxide semiconductor) transistors are used as switches in a charging-discharging circuit in the charge pump power supply circuits.

Figure 9:
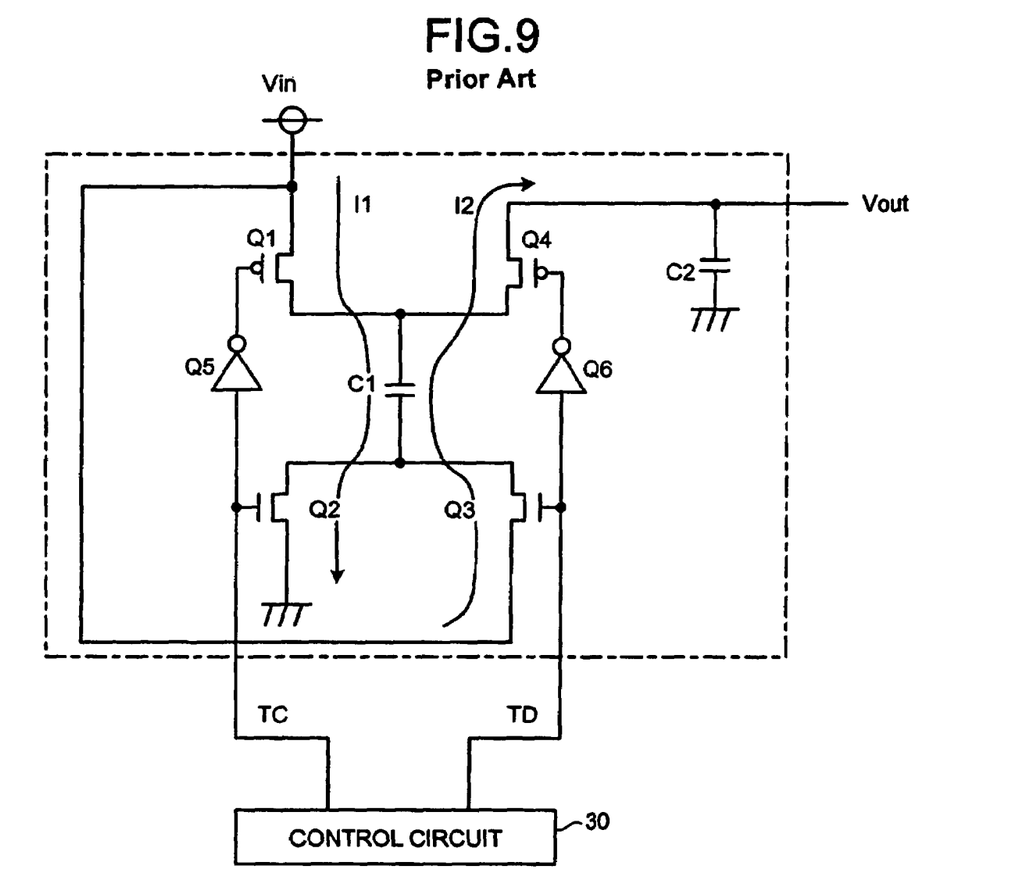
FIG. 9 is a circuit diagram of a basic structure of a charge pump power supply circuit (booster circuit)

FIG. 9 is circuit diagram of a basic structure of the charge pump power supply circuit (booster circuit). As shown in FIG. 9, in a charging circuit, a source electrode of a PMOS (p-channel metal-oxide semiconductor) transistor Q1 is connected to an input power supply Vin, and a drain electrode of the PMOS transistor Q1 is connected to one of the electrodes of a flying capacitor C1. A drain electrode of an NMOS (n-channel metal-oxide semiconductor) transistor Q2 is connected to the other electrode of the flying capacitor C1, and a source electrode of the NMOS transistor Q2 is grounded. Further, a charge-control signal TC that is generated by a control circuit 30 is applied directly to a gate electrode of the NMOS transistor Q2 and applied to a gate electrode of the PMOS transistor Q1 via an inverter Q5.

Moreover, in a discharging circuit, a source electrode of an NMOS transistor Q3 is connected to the input power supply Vin, and a drain electrode of the NMOS transistor Q3 is connected to the other electrode of the flying capacitor C1. A source electrode of a PMOS transistor Q4 is connected to the one of the electrodes and an output capacitor C2 is disposed between a drain electrode of the PMOS transistor Q4 and a ground. Further, a discharge-control signal TD that is generated by the control circuit 30 is applied directly to a gate electrode of the NMOS transistor Q3 and applied to a gate electrode of the PMOS transistor Q4 via an inverter Q6.

Figure 10:
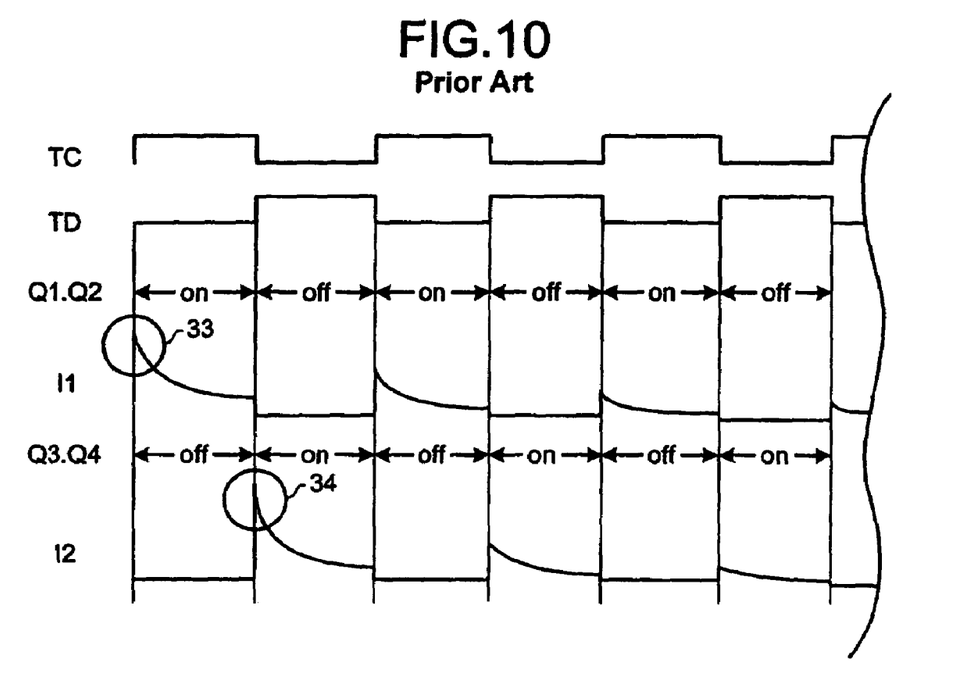
FIG. 10 is a time chart of the operation of the conventional charge pump power supply circuit (booster circuit) shown in FIG. 9.

FIG. 10 is a time chart of the operations of the charge pump power supply circuit. The charge-control signal TC and the discharge-control signal TD that are generated by the control circuit 30 are control signals that regulate a charge cycle. The charge-control signal TC and the discharge-control signal TD are signals of a binary level that repeat a high-level period and a low-level period alternately, while the polarities differ with the same duty ratio. Therefore, during a period when the level of the charge-control signal TC is high and the level of the discharge-control signal TD is low, each of the PMOS transistor Q1 and the NMOS transistor Q2 performs an ON operation. Moreover, during a period when the level of the discharge-control signal TD is high and the level of the charge-control signal TC is low, each of the NMOS transistor Q3 and the PMOS transistor Q4 perform an ON operation.

In other words, during the period when the level of the charge-control signal TC is high and the level of the discharge-control signal TD is low, the PMOS transistor Q1 that is disposed in series between the input power supply Vin and the ground, and the PMOS transistor Q1 and the NMOS transistor Q2 in a series circuit of the flying capacitor C1 and the NMOS transistor Q2, perform an ON operation. As a result, a charging current I1 flows and a charging operation for the flying capacitor C1 is performed.

Moreover, during the period when the level of the discharge-control signal TD is high and the level of the charge-control signal TC is low, the NMOS transistor Q3 that is disposed between the input power supply Vin and the ground, and the NMOS transistor Q3 and the PMOS transistor Q4 in series circuit of the flying capacitor C1, the PMOS transistor Q4, and the output capacitor C2, perform ON operation. As a result, a discharging current I2 flows and a discharging operation (boosting operation) in which a voltage that is obtained by adding a voltage of the input power supply Vin to a charging voltage of the flying capacitor C1 is transferred to the output capacitor C2, is performed.

By performing the charging operation and the discharging operation alternately, a voltage Vout is obtained in which the voltage of the input power supply Vin is boosted in the output capacitor C2. In that case, an electric charge is stored in the flying capacitor C1 and to reduce a loss while transferring the electric charge stored in the flying capacitor C1 to the output capacitor C2, four MOS transistors that are switches, which have a small ON-state resistance, are used. As a result, with no electric charge or a small amount of electric charge stored in the flying capacitor C1 and the output capacitor C2, as shown in FIG. 10, high rush currents 33 and 34 flow at a time of start up. If the operation is repeated under these conditions, there is a negative effect on the input power supply Vin. Similar problem occurs even in a discharging circuit of an inverting circuit (not shown) of the charge pump power supply circuit.

Various measures have been proposed so far to prevent the rush current. For example, according to Japanese Patent Application Laid-open Publication No. 2003-18822, a constant-current circuit is provided between an input power supply and an output capacitance. At a start up of the power supply, an operation of a charge pump circuit is stopped and charging up to a voltage of output capacitance is performed by the constant-current circuit. Then, a normal operation of the charge pump is started. A technology of shortening a charge cycle at the start up has been disclosed.

Moreover, according to Japanese Patent Application Laid-open Publication No. 2003-219634, a technology in which when the charge pump circuit is not in operation, the flying capacitor C1 and the output capacitor C2 are charged by a back-up charging circuit, is disclosed. According to this technology, further, at a start up of an operation of the charge pump circuit, it is changed to a small-capacity switch that is provided in parallel with a main charge pump switch.

The method disclosed in the Japanese Patent Application Laid-open Publication No. 2003-18822 can reduce the rush current; however, because the voltage of the output capacitor becomes double the input voltage, the rush current flows for charging the output capacitor up to twice the input voltage.

Moreover, according to the technology disclosed in the Japanese Patent Application Laid-open Publication No. 2003-219634, in addition to a necessity of providing a new auxiliary switch, the rush current is generated due to a difference in ON-state resistances of the auxiliary switch and the main switch.

SUMMARY OF THE INVENTION

It is an object of the present invention to at least solve the problems in the conventional technology.

According to an aspect of the present invention, a charge pump power supply circuit includes two charging units that perform an operation of charging a capacitor up to an input voltage, at least one of the two charging units includes a plurality of parallel connected MOS transistors; two boosting units that perform an operation of boosting by adding the input voltage to a charging voltage of the capacitor; and a drive unit that causes each of the MOS transistors to perform an ON operation such that all of the MOS transistors are ON at the end of a time series.

According to another aspect of the present invention, a charge pump power supply circuit includes two charging units that perform an operation of charging a capacitor up to an input voltage; two boosting units that perform an operation of boosting by adding the input voltage to a charging voltage of the capacitor, at least one of the two boosting units includes a plurality of parallel connected MOS transistors; and a drive unit that causes each of the MOS transistors to perform an ON operation such that all of the MOS transistors are ON at the end of a time series.

According to still another aspect of the present invention, a charge pump power supply circuit includes two charging units that perform an operation of charging a capacitor up to an input voltage, at least one of the two charging units includes a plurality of parallel connected MOS transistors; two inverting units that perform an operation of inverting the voltage stored in the capacitor and outputting the inverted voltage; and a drive unit that causes each of the MOS transistors to perform an ON operation such that all of the MOS transistors are ON at the end of a time series.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are described below in detail with reference to the accompanying diagrams.

Figure 1:
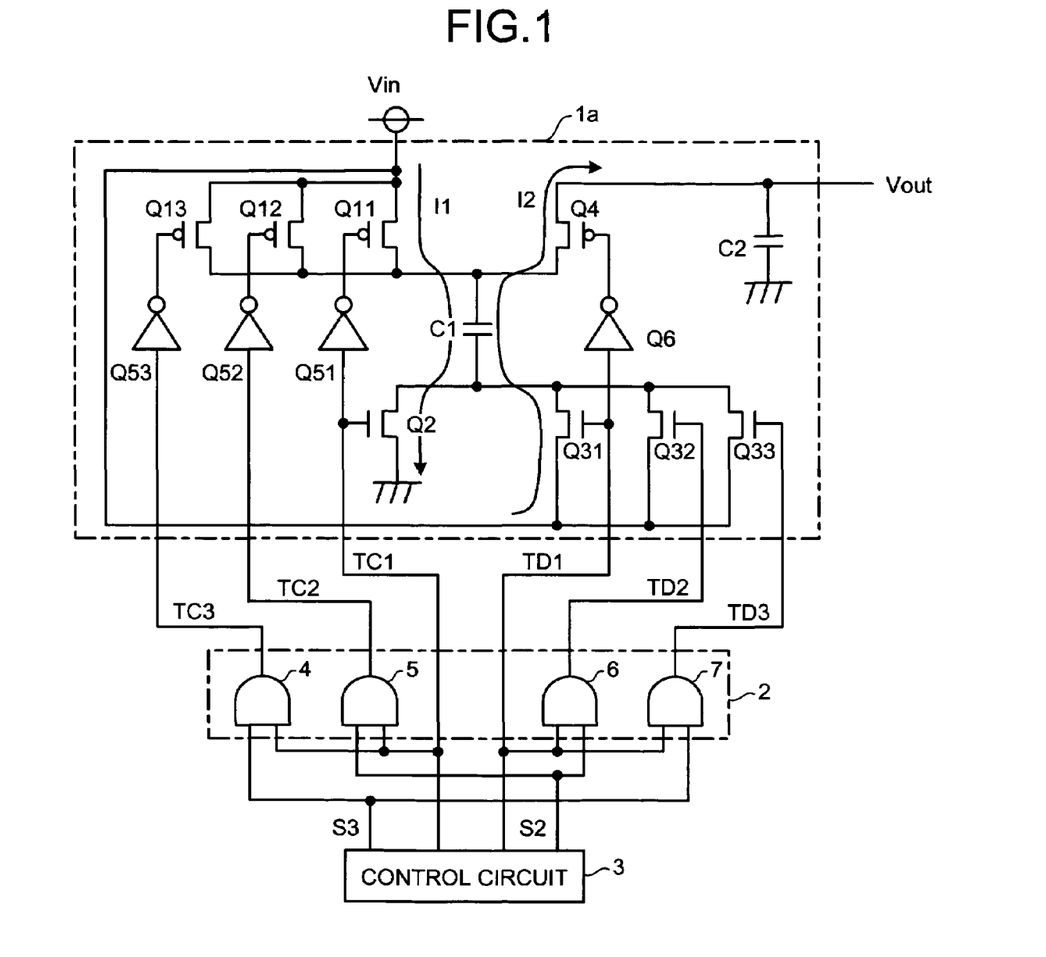
FIG. 1 is a circuit diagram of a charge pump power supply circuit (booster circuit) according to a first embodiment of the present invention.

FIG. 1 is a circuit diagram of a charge pump power supply circuit (booster circuit) according to a first embodiment of the present invention. As shown in FIG. 1, in a charging circuit, in a basic circuit 1a of the booster circuit, a source electrode of each of three parallel connected PMOS transistors Q11, Q12, and Q13 is connected to an input power supply Vin and a drain electrode of each of the PMOS transistors Q11, Q12, and Q13 is connected to one of the electrodes of a flying capacitor C1. A drain electrode of an NMOS transistor Q2 is connected to the other electrode of the flying capacitor C1, and a source electrode of the NMOS transistor Q2 is grounded.

Moreover, in a discharging circuit, a source electrode of each of three parallel connected NMOS transistors Q31, Q32, and Q33 is connected to the input power supply Vin and a drain electrode of each of the NMOS transistors Q31, Q32, and Q33 is connected to the other electrode of the flying capacitor C1. A source electrode of a PMOS transistor Q4 is connected to the one of the electrodes of the flying capacitor C1, and an output capacitor C2 is connected between a drain electrode of the PMOS transistor Q4 and the ground.

Further, a charge-control signal TC1 that is generated by a control circuit 3 is applied directly to a gate electrode of the NMOS transistor Q2 and applied to a gate electrode of the PMOS transistor Q11 via an inverter Q51. Moreover, a discharge-control signal TD1 that is generated by the control circuit 3 is applied directly to a gate electrode of the NMOS transistor Q31 and applied to a gate electrode of the PMOS transistor Q4 via an inverter Q6.

In this case, the control circuit 3 generates time-series control signals S2 and S3 that are binary level signals. The time-series control signals S2 and S3 as well, have low level at a time of a power supply start up and when a predetermined time is elapsed (for example time equivalent to the number of the charge-control signals TC1 or the discharge-control signal TD1 equal to a duty ratio) the time-series control signals S2 and S3 rise from the low level to a high level. A correlation between periods that are low level in the time-series control signals S2 and S3 is, the time-series control signal S2<the time-series control signal S3. These periods that are low level are delay times that regulate an operation cycle described later, and mainly are delay times that depend on a time constant of a capacitance of two capacitors and a series ON-state resistance of an MOS transistor.

In a distribution circuit 2, the charge-control signal TC1 and the time-series control signal S2 are supplied to an AND gate 5, and the charge-control signal TC1 and the time-series control signal S3 are supplied to an AND gate 4. Charge-control signals TC2 and TC3 are generated by the AND gates 5 and 4 respectively. The charge-control signal TC2 that is output from the AND gate 5 is applied to a gate electrode of the PMOS transistor Q12 via an inverter Q52. Moreover, the charge-control signal TC3 that is output from the AND gate 4 is applied to a gate electrode of the PMOS transistor Q13 via an inverter Q53.

Furthermore, in the distribution circuit 2, AND gastes 6 and 7 generate respective signals TD2 and TD3, corresponding to; the time-series control signals S2 and S3. The discharge-control signal TD2 that is output from the AND gate 6 is applied directly to a gate electrode of the NMOS transistor Q32. Moreover, the discharge-control signal TD3 that is output from the AND gate 7 is applied directly to a gate electrode of the NMOS transistor Q33.

Thus, in the basic circuit 1a, out of two MOS transistors that perform the charging operation, a PMOS transistor on a side of the input power supply Vin is formed by the PMOS transistors Q11, Q12, and Q13, and an NMOS transistor on a ground side is formed by one NMOS transistor Q2 as in the basic structure.

Moreover, in the basic circuit 1a, out of two MOS transistors that perform a boosting operation (discharging operation), an NMOS transistor on a side of the input power supply Vin is formed by the NMOS transistors Q31, Q32, and Q33, and a PMOS transistor on a side of boosted output is formed by one PMOS transistor Q4 as in the basic structure.

In this case, the combined ON-state resistance of the PMOS transistors Q11, Q12, and Q13 is equal to an ON-state resistance (approximately 1 ohm) of a corresponding one PMOS transistor in the charging circuit in the basic structure of the booster charge pump circuit. Moreover, the combined ON-state resistance of the three NMOS transistors Q31, Q32, and Q33 that are connected in parallel is equal to an ON-state resistance (approximately 1 ohm) of a corresponding one NMOS transistor in the discharging circuit in the basic structure of the booster charge pump circuit.

The correlation between the ON-state resistances of the PMOS transistors Q11, Q12, and Q13 is Q11>Q12>Q13. Moreover, the correlation between the ON-state resistances of the NMOS transistors Q31, Q32, and Q33 is Q31>Q32>Q33.

Figure 2:
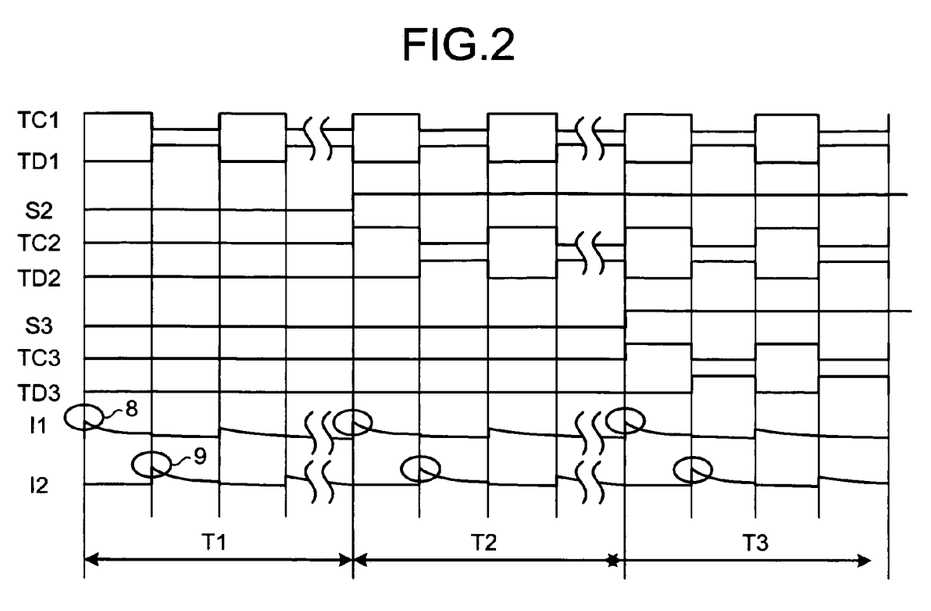
FIG. 2 is a time chart of the operation of the charge pump power supply circuit (booster circuit) shown in FIG. 1.

FIG. 2 is a time chart of a rush-current limiting operation performed by the charge pump power supply circuit shown in FIG. 1. The charge pump power supply circuit performs a booster operation in three operation cycles.

The first operation cycle T1 is an operation cycle immediately after the power supply start up, and since in the first operation cycle T1, both the time-series control signals S2 and S3 have low level, the charge-control signals TC2 and TC3 as well as the discharge-control signals TD2 and TD3 have low level. Therefore, during a predetermined time T1 immediately after the power supply start up, because of the charge-control signal TC1, the PMOS transistor Q11 and the NMOS transistor Q2 perform an ON-OFF operation, and because of the discharge-control signal TD1, the NMOS transistor Q31 and the PMOS transistor Q4 perform the ON-OFF operation.

In the second operation cycle T2, the time-series control signal S2 becomes high level as well as the charge-control signal TC2 and the discharge-control signal TD2 become high level. Since the time-series control signal S3 has low level as it has been, the charge-control signal TC3 and the discharge-control signal TD3 have low level as they have been. Therefore, during the second operation cycle T2, because of the charge-control signal TC1, the PMOS transistor Q11 and the NMOS transistor Q2 perform the ON-OFF operation, and because of the discharge-control signal TD1, the NMOS transistor Q31 and the PMOS transistor Q4 perform the ON-OFF operation. In addition to this, because of the charge-control signal TC2, the PMOS transistor Q12 performs the ON-OFF operation and because of the discharge-control signal TD2, the NMOS transistor Q32 performs the ON-OFF operation.

In the third operation cycle T3, since the time-series control signal S3 as well becomes high level, the charge-control signal TC3 and the discharge-control signal TD3 as well become high level. Therefore, during the third operation cycle T3, because of the charge-control signal TC1, the PMOS transistor Q11 and the NMOS transistor Q2 perform the ON-OFF operation, and because of the discharge-control signal TD1, the NMOS transistor Q31 and the PMOS transistor Q4 perform the ON-OFF operation. In addition to this, because of the charge-control signal TC2, the PMOS transistor Q12 performs the ON-OFF operation, and because of the discharge-control signal TD2, the NMOS transistor Q32 performs the ON-OFF operation. Further, because of the charge-control signal TC3, the PMOS transistor Q13 performs the ON-OFF operation and because of the discharge-control signal TD3, the NMOS transistor Q33 performs the ON-OFF operation.

At the time of power supply start up, since the flying capacitor C1 and the output capacitor C2 are without any electric charge, the rush current is included in a charging current I1 and a discharging current I2. In this case, a peak value of the rush current to the flying capacitor C1 is determined by the input power supply Vin and a series ON-state resistance of the MOS transistors that are disposed in series, which form the charging circuit and the discharging circuit.

For this reason, immediately after the power supply start up, the charging circuit is formed by using the PMOS transistor Q11 that has the highest ON-state resistance, and at the same time the discharging circuit is formed by using the NMOS transistor Q31 that has the highest ON-state resistance. By doing so, it is possible to reduce a peak value of rush currents 8 and 9 that are included in the charging current I1 and the discharging current I2.

However, in this condition, since the ON-state resistance of the PMOS transistor Q11 and the NMOS transistor Q31 is high, a boosted electric power that is necessary at an output Vout cannot be obtained. Therefore, as has already been described, by using the time-series control signal S2 that has a fixed delay, a second charge-control signal TC2 and a second discharge-control signal TD2 are created, and in the charging circuit, the combined ON-state resistance is reduced by connecting the PMOS transistor Q12 that has a second highest ON-state resistance, in parallel with the PMOS transistor Q11. At the same time, in the discharging circuit, the combined ON-state resistance is reduced by connecting the NMOS transistor Q32 that has a second highest ON-state resistance, in parallel with the NMOS transistor Q31. By doing so, power that is supplied to the output Vout increases to become the boosted electric power that is necessary.

Further, by using the time-series control signal S3 that has a fixed delay, a third charge-control signal TC3 and a third discharge-control signal TD3 are created, and in the charging circuit, the combined ON-state resistance is reduced (to approximately 1 ohm) by connecting the PMOS transistor Q13 that has a third highest ON-state resistance, in parallel with the PMOS transistors Q11 and Q12. At the same time, in the discharging circuit, an actual ON-state resistance is reduced (to approximately 1 ohm) by connecting the NMOS transistor Q33 that has a third highest ON-state resistance, in parallel with the NMOS transistors Q31 and Q32. This condition is maintained from here onward. Because of this, the boosted electric power that is necessary for the output Vout is supplied.

Thus, according to the first embodiment, in the basic structure of the booster charge pump circuit, each of an MOS transistor on the side of the input power supply out of two MOS transistors that perform the charging operation and an MOS transistor on the side of the input power supply out of two MOS transistors that perform the discharging operation, are formed by three MOS transistors connected in parallel. In other words, a structure is formed such that the corresponding MOS transistors in the basic structure are divided into three parts, and introduced in the charging circuit and the discharging circuit in a time series in a descending order from the one that has the high ON-state resistance.

Therefore, it is possible to limit the rush current and to obtain the desired output voltage by using a type of the basic structure of the booster charge pump circuit. Since there is no need to add a new circuit such as a circuit to pre-charge the capacitor or an auxiliary switch, the scale of the circuit can be reduced to a smaller scale.

Figure 3:
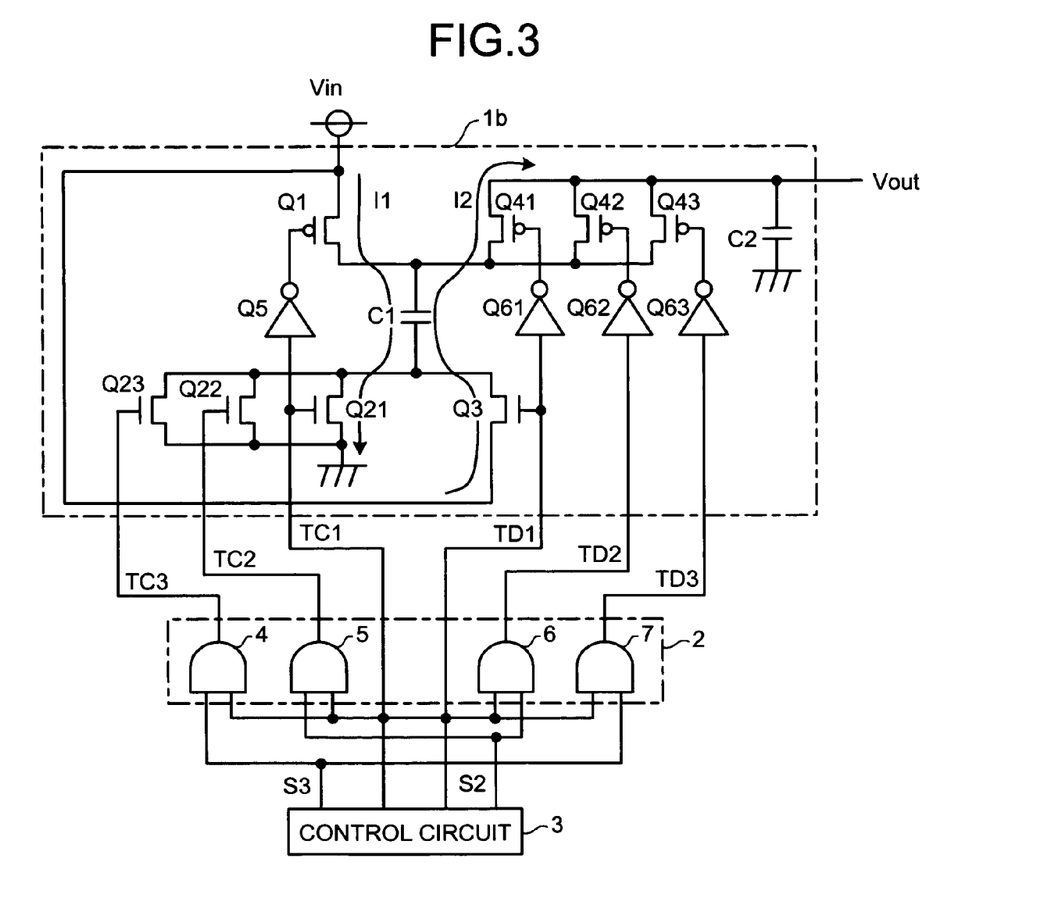
FIG. 3 is a circuit diagram of a charge pump power supply circuit (booster circuit) according to a second embodiment of the present invention.

FIG. 3 is a circuit diagram of a charge pump power supply circuit (booster circuit) according to a second embodiment of the present invention. As shown in FIG. 3, in a charging circuit, in a basic circuit 1b of the booster circuit, a source electrode of a PMOS transistor Q1 is connected to the input power supply Vin and a drain electrode of the PMOS transistor Q1 is connected to one of the electrodes of the flying capacitor C1. A drain electrode of each of three parallel connected NMOS transistors Q21, Q22, and Q23 is connected to the other electrode of the flying capacitor C1, and a source electrode of each of the NMOS transistors Q21, Q22, and Q23 is grounded.

Moreover, in a discharging circuit, a source electrode of an NMOS transistor Q3 is connected to the input power supply Vin, and a drain electrode of the NMOS transistor Q3 is connected to the other electrode of the flying capacitor C1. A source electrode of each of three parallel connected PMOS transistors Q41, Q42, and Q43 is connected to the one of the electrodes of the flying capacitor C1, and the output capacitor C2 is disposed between a drain electrode of each of the PMOS transistors Q41, Q42, and Q43 and the ground.

Further, the charge-control signal TC1 that is generated by the control circuit 3 is applied directly to a gate electrode of the NMOS transistor Q21 and applied to a gate electrode of the PMOS transistor Q1 via an inverter Q5. Moreover, the discharge control signal TD1 that is generated by the control circuit 3 is applied directly to a gate electrode of the NMOS transistor Q3 and applied to a gate electrode of the PMOS transistor Q41 via an inverter Q61.

The distribution circuit 2 outputs the charge-control signals TC2 and TC3 and the discharge-control signals TD2 and TD3, which are the same as those according to the first embodiment. The charge-control signal TC2 is applied to a gate electrode of the NMOS transistor Q22 and the charge-control signal TC3 is applied to a gate electrode of the NMOS transistor Q23. Moreover, the discharge-control signal TD2 is applied to a gate electrode of the PMOS transistor Q42 via an inverter Q62, and the discharge-control signal TD3 is applied to a gate electrode of the PMOS transistor Q43 via an inverter Q63.

Thus, in the basic circuit 1b, in a basic structure of the booster charge pump circuit, out of two MOS transistors that perform the charging operation, a PMOS transistor on the side of the input power supply Vin is formed by one PMOS transistor Q1 as in the basic structure, and an NMOS transistor on the ground side is formed by the NMOS transistors Q21, Q22, and Q23.

Moreover, in the basic circuit 1b, in the basic structure of the booster charge pump circuit, out of two MOS transistors that perform the boosting operation (discharging operation), an MOS transistor on the side of the input power supply Vin is formed by the NMOS transistor Q3 as in the basic structure, and the side of boosted output is formed by the PMOS transistors Q41, Q42, and Q43.

In this case, the combined ON-state resistance of the NMOS transistors Q21, Q22, and Q23 is equal to an ON-state resistance (approximately 1 ohm) of a corresponding one MOS transistor in the charging circuit in the basic structure of the booster charge pump circuit. Moreover, the combined ON-state resistance of the PMOS transistors Q41, Q42, and Q43 is equal to an ON-state resistance (approximately 1 ohm) of a corresponding one MOS transistor in the discharging circuit in the basic structure of the booster charge pump circuit.

The correlation between the ON-state resistances of the NMOS transistors Q21, Q22, and Q23 is Q21>Q22>Q23. Moreover, the correlation between the ON-state resistances of the PMOS transistors Q41, Q42, and Q43 is Q41>Q42>Q43.

Even in the second embodiment, as explained with respect to FIG. 2, immediately after the power supply start up, the rush current can be limited because the PMOS transistor Q41 and the NMOS transistor Q21 that has the highest ON-state resistance, are introduced in the discharging circuit and the charging circuit. Then, as the predetermined time is elapsed, the PMOS transistor Q42 and the NMOS transistor Q22 that have the second highest ON-state resistance, are introduced additionally. Further, as the predetermined time is elapsed, the PMOS transistor Q43 and the NMOS transistor Q23 that have the third highest ON-state resistance, are introduced additionally, and this condition is maintained from here onward. Thus, the boosted electric power that is necessary for the output Vout is obtained.

Thus, according to the second embodiment, in the basic structure of the booster charge pump circuit, each of an MOS transistor on the ground side out of two MOS transistors that perform the charging operation and an MOS transistor on the side of the boosted voltage out of two MOS transistors that perform the boosting operation (discharging operation) is formed by three MOS transistors connected in parallel. In other words, a structure is formed such that the corresponding MOS transistors in the basic structure are divided into three parts, and introduced in the charging circuit and the discharging circuit in time series in a descending order from the one that has the high ON-state resistance.

Therefore, it is possible to limit the rush current and to obtain the desired output voltage by using a type of the basic structure of the booster charge pump circuit. Since there is no need to add a new circuit such as a circuit to pre-charge the capacitor or an auxiliary switch, the scale of the circuit can be made smaller.

Figure 4:
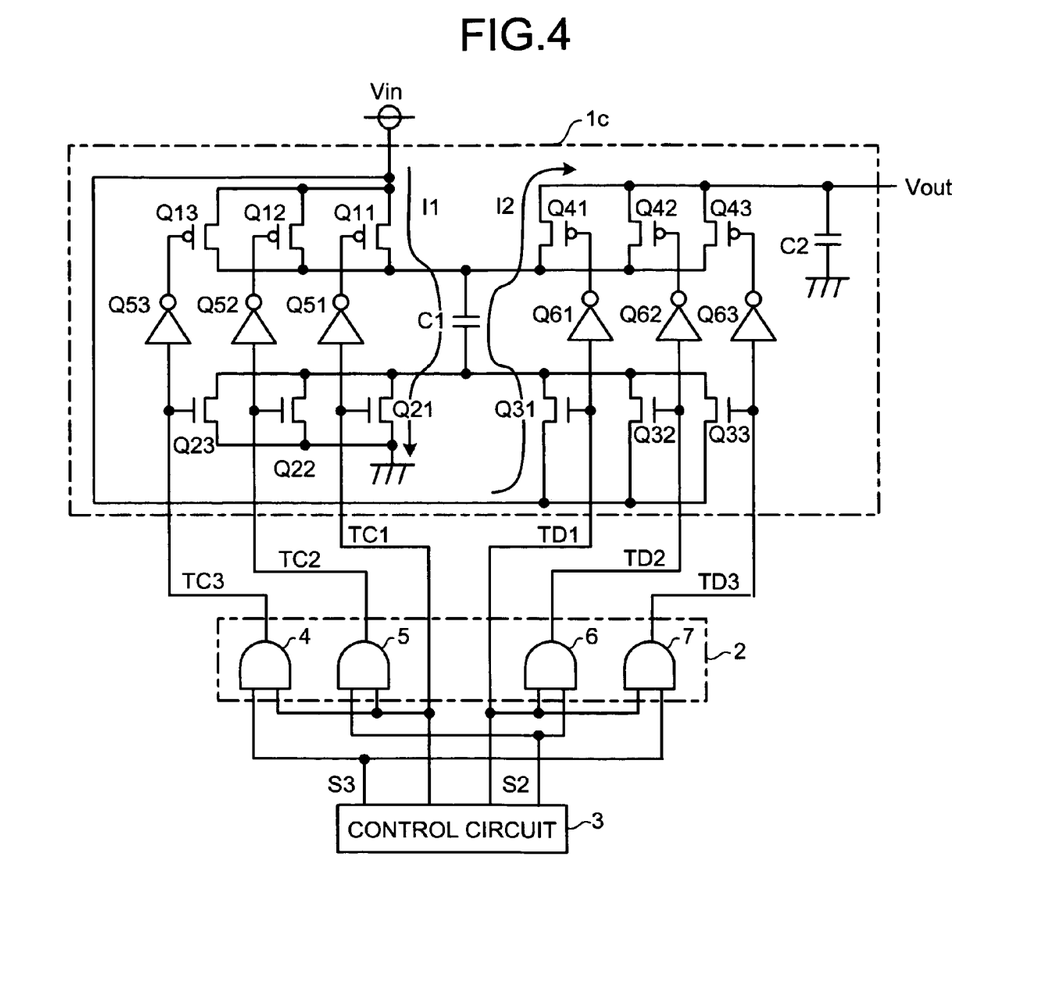
FIG. 4 is a circuit diagram of a charge pump power supply circuit (booster circuit) according to a third embodiment of the present invention.

FIG. 4 is a circuit diagram of a charge pump power supply circuit (booster circuit) according to a third embodiment of the present invention. As shown in FIG. 4, in a charging circuit, in a basic circuit 1c of the booster circuit, the source electrode of each of the parallel connected PMOS transistors Q11, Q12, Q13 is connected to the input power supply Vin and the drain electrode of each of the PMOS transistors Q11, Q12, and Q13 is connected to the one of the electrodes of the flying capacitor C1. The drain electrode of each of the parallel connected NMOS transistors Q21, Q22, and Q23 is connected to the other electrode of the flying capacitor C1, and the source electrode of each of the NMOS transistors Q21, Q22, and Q23 is grounded.

Moreover, the source electrode of each of the parallel connected NMOS transistors Q31, Q32, and Q33 is connected to the input power supply and the drain electrode of each of the NMOS transistors Q31, Q32, and Q33 is connected to the other electrode of the flying capacitor C1. The source electrode of each of the three PMOS transistors Q41, Q42, and Q43 is connected to the one of the electrodes of the flying capacitor C1, and the output capacitor C2 is connected between the drain electrode of each of the PMOS transistors Q41, Q42, and Q43 and the ground.

Further, the charge-control signal TC1 that is generated by the control circuit 3 is applied directly to the gate electrode of the NMOS transistor Q21 and applied to the gate electrode of the PMOS transistor Q11 via the inverter Q51. Moreover, the discharge-control signal TD1 that is generated by the control circuit 3 is applied directly to the gate electrode of the NMOS transistor Q31 and applied to the gate electrode of the PMOS transistor Q41 via the inverter Q61.

The distribution circuit 2 outputs the charge-control signals TC2 and TC3 and the discharge-control signals TD2 and TD3, which are the same as those according to the first embodiment. The charge-control signal TC2 is applied directly to the gate electrode of the NMOS transistor Q22 and applied to the gate electrode of the PMOS transistor Q12 via the inverter Q52. The charge-control signal TC3 is applied to the gate electrode of the NMOS transistor Q23 and applied to the PMOS transistor Q13 via the inverter Q53.

Moreover, the discharge-control signal TD2 is applied directly to the gate electrode of the NMOS transistor Q32 and applied to the gate electrode of the PMOS transistor Q42 via the inverter Q62. The discharge-control signal TD3 is applied directly to the gate electrode of the NMOS transistor Q33 and applied to the gate electrode of the PMOS transistor Q43 via the inverter Q63.

Thus, in the basic circuit 1c, in a basic structure of the booster charge pump circuit, out of two MOS transistors that perform the charging operation, an MOS transistor on the side of the input power supply Vin is formed by the PMOS transistors Q11, Q12, and Q13 and an MOS transistor on the ground side is formed by the NMOS transistor Q21, Q22, and Q23.

Moreover, in the basic circuit 1c, in the basic structure of the booster charge pump circuit, out of two MOS transistors that perform the boosting operation (discharging operation), an MOS transistor on the side of the input power supply Vin is formed by the NMOS transistors Q31, Q32, and Q33, and an MOS transistor on the side of the boosted output is formed by the PMOS transistors Q41, Q42, and Q43.

In this case, the combined ON-state resistance of the PMOS transistors Q11, Q12, and Q13 is equal to an ON-state resistance (approximately 1 ohm) of a corresponding PMOS transistor in the charging circuit in the basic structure of the booster charge pump circuit. Similarly, the combined ON-state resistance of the NMOS transistors Q21, Q22, and Q23 is equal to an ON-state resistance (approximately 1 ohm) of a corresponding NMOS transistor in the charging circuit in the basic structure of the booster charge pump circuit.

Moreover, the combined ON-state resistance of the NMOS transistors Q31, Q32, and Q33 is equal to an ON-state resistance (approximately 1 ohm) of a corresponding one NMOS transistor in the discharging circuit in the basic structure of the booster charge pump circuit. Similarly, the combined ON-state resistance of the three PMOS transistors Q41, Q42, and Q43 is equal to an ON-state resistance (approximately 1 ohm) of a corresponding PMOS transistor in the discharging circuit in the basic structure of the booster charge pump circuit.

The correlation between the ON-state resistances of the PMOS transistors Q11, Q12, and Q13 is Q11>Q12>Q13. The correlation between the ON-state resistances of the NMOS transistors Q21, Q22, and Q23 is Q21>Q22>Q23. Moreover, the correlation between the ON-state resistances of the three NMOS transistors Q31, Q32, and Q33 is Q31>Q32>Q33, and the correlation between the ON-state resistances of the three PMOS transistors Q41, Q42, and Q43 is Q41>Q42>Q43.

Even according to the third embodiment, in the same manner as explained with reference to FIG. 2, immediately after the power supply start up, since the NMOS transistor Q21 and the PMOS transistor Q11 that have the highest ON-state resistance, are introduced in the charging circuit, the rush current is limited even more effectively. Then, when the predetermined time is elapsed, the PMOS transistor Q42, the NMOS transistor Q32, the NMOS transistor Q22, and the PMOS transistor Q12 that have the second highest ON-state resistance are introduced additionally. Again when the predetermined time is elapsed, the PMOS transistor Q43, the NMOS transistor Q33, the NMOS transistor Q23, and the PMOS transistor Q13 that has the third highest ON-state resistance, are introduced additionally, and this condition is maintained from here onward. Thus, the boosted electric power that is necessary for the output Vout is obtained.

Thus, according to the third embodiment, in the basic structure of the booster charge pump circuit, each of two MOS transistors that perform the charging operation and two MOS transistors that perform boosting operation (discharging operation) is formed by three MOS transistors connected in parallel. In other words, a structure is formed such that the four MOS transistors in the basic structure are divided into three parts, and introduced in the charging circuit and the discharging circuit in time series in a descending order from the one that has the high ON-state resistance.

Therefore, it is possible to limit the rush current and to obtain the desired output voltage by using a type of the basic structure of the booster charge pump circuit. Since there is no need to add a new circuit such as a circuit to pre-charge the capacitor or an auxiliary switch, the scale of the circuit can be reduced to a smaller scale.

Figure 5:
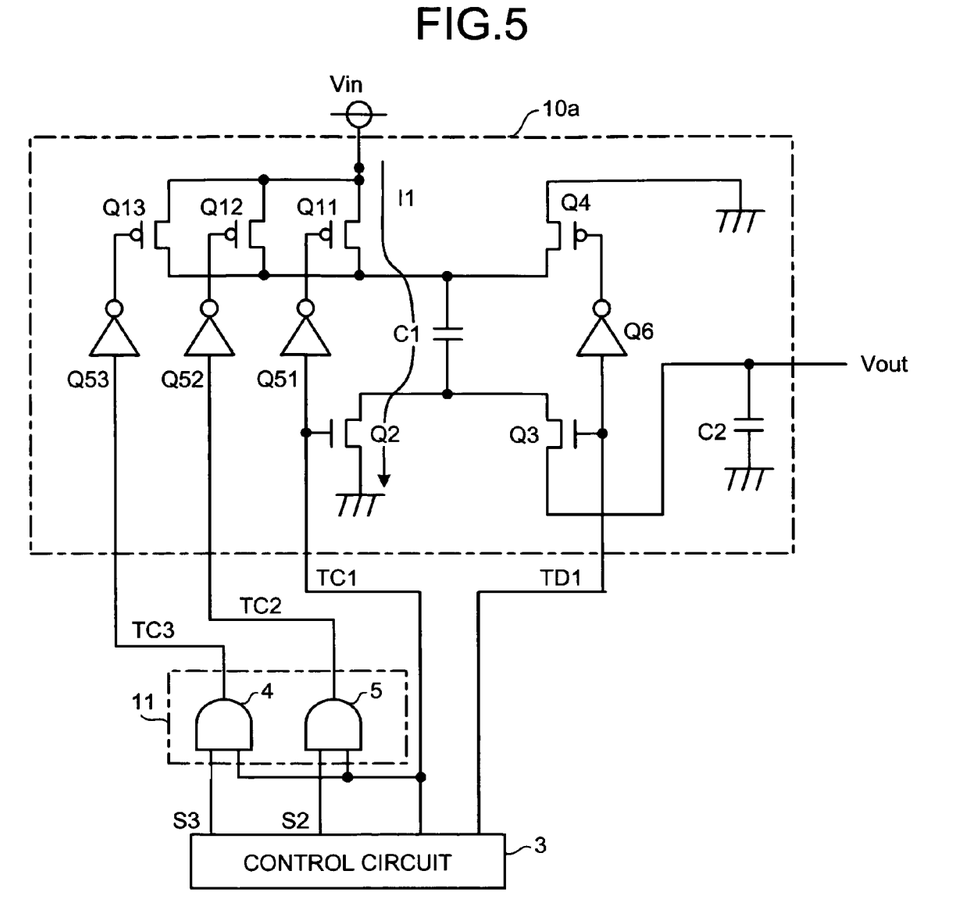
FIG. 5 is a circuit diagram of a charge pump power supply circuit (inverting circuit) according to a fourth embodiment of the present invention.

FIG. 5 is a circuit diagram of a charge pump power supply circuit (inverting circuit) according to a fourth embodiment of the present invention. As shown in FIG. 5, in a charging circuit, in a basic circuit 10a of the inverting circuit, the source electrode of each of the three PMOS transistors Q11, Q12, and Q13 is connected to the input power supply Vin, and the drain electrode of each of the PMOS transistors Q11, Q12, and Q13 is connected to the one of the electrodes of the flying capacitor C1. The drain electrode of the NMOS transistor Q2 is connected to the other electrode of the flying capacitor C1, and the source electrode of the NMOS transistor Q2 is grounded.

Moreover, in a discharging circuit, the drain electrode of the NMOS transistor Q3 is connected to the other electrode of the flying capacitor C1, and the output capacitor C2 is disposed between the source electrode of the NMOS transistor Q3 and the ground. The drain electrode of the PMOS transistor Q4 is connected to the one of the electrodes of the flying capacitor C1 and a source electrode of the PMOS transistor Q4 is grounded.

Further, the charge-control signal TC1 that is generated by the control circuit 3 is applied directly to the gate electrode of the NMOS transistor Q2 and applied to the gate electrode of the PMOS transistor Q11 via the inverter Q51. Moreover, the discharge-control signal TD1 that is generated by the control circuit 3 is applied directly to the gate electrode of the NMOS transistor Q3, as well as on the gate electrode of the PMOS transistor Q4 via the inverter Q6.

In a distribution circuit 11, the charge-control signal TC1 and the time-series control signal S2 are supplied to the AND gate 5, and the charge-control signal TC1 and the time-series control signal S3 are supplied to the AND gate 4. The charge-control signals TC2 and TC3 are generated by the AND gates 5 and 4 respectively. The charge-control signal TC2 that is output from the AND gate 5 is applied to the gate electrode of the PMOS transistor Q12 via the inverter Q52. Moreover, the charge-control signal TC3 that is output from the AND gate 4 is applied to the gate electrode of the PMOS transistor Q13 via the inverter Q53.

Thus, in the basic circuit 10a, in a basic structure of the inverting charge pump circuit, out of two MOS transistors, which perform the charging operation, a PMOS transistor on the side of the input power supply Vin is formed by the three PMOS transistors Q11, Q12, and Q13, and an NMOS transistor on the ground side is formed by one NMOS transistor Q2 as in the basic structure.

In this case, the combined ON-state resistance of the PMOS transistors Q11, Q12, and Q13 is equal to an ON-state resistance (approximately 1 ohm) of a corresponding one PMOS transistor in the charging circuit in the basic structure of the inverting charge pump circuit. The correlation between the ON-state resistance of the three PMOS transistors Q11, Q12, and Q13 is Q11>Q12>Q13.

Figure 6:
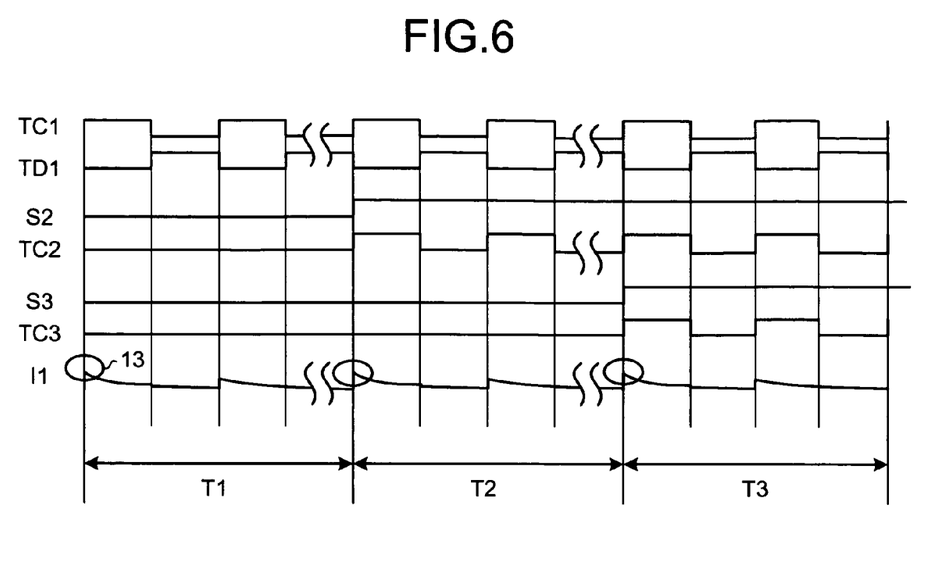
FIG. 6 is a time chart of the operation of the charge pump power supply circuit (inverting circuit) shown in FIG. 5.

FIG. 6 is a time chart of a rush-current limiting operation performed by the charge pump power supply circuit shown in FIG. 5. As shown in FIG. 6, in the charge pump power supply circuit (inverting circuit) showed in FIG. 5, an inverting operation in performed according to three operation cycles T1, T2, and T3.

The first operation cycle T1 is an operation cycle immediately after the power supply start up, and since in the first operation cycle T1 both the time-series control signals S2 and S3 have low level, the charge-control signals TC2 and TC3 are low level. Therefore, during the predetermined time T1 immediately after the power supply start up, because of the charge-control signal TC1, the PMOS transistor Q11 and the NMOS transistor Q2 perform the ON-OFF operation, and because of the discharge-control signal TD1, the NMOS transistor Q3 and the PMOS transistor Q4 perform the ON-OFF operation.

In the second operation cycle T2, since the time-series control signal S2 as well becomes high level, the charge-control signal TC2 and the discharge-control signal TD2 become high level. Since the time-series control signal S3 has low level as it has been, the charge-control signal TC3 has low level as it has been. Therefore, during the second operation cycle T2, because of the charge-control signal TC1, the PMOS transistor Q11 and the NMOS transistor Q2 perform the ON-OFF operation, and because of the discharge control signal TD1, the NMOS transistor Q3 and the PMOS transistor Q4 perform the ON-OFF operation. In addition to this, because of the charge-control signal TC2, the PMOS transistor Q12 performs the ON-OFF operation.

In the third operation cycle T3, since the time-series control signal S3 as well becomes high level, the charge-control signal TC3 becomes high level. Therefore, during the third operation cycle T3, because of the charge control signal TC1, the PMOS transistor Q11 and the NMOS transistor Q2 perform the ON-OFF operation, and because of the discharge-control signal TD1, the NMOS transistor Q3 and the PMOS transistor Q4 perform the ON-OFF operation. In addition to this, because of the charge-control signal TC2, the PMOS transistor Q12 performs the ON-OFF operation, and because of the charge-control signal TC3, the PMOS transistor Q13 performs the ON-OFF operation.

The operation so far is described below. At the time of power supply start up, since the flying capacitor C1 and the output capacitor C2 are without any electric charge, the rush current is included in the charging current I1. In this case, the peak value of the rush current to the flying capacitor C1 is determined by the input power supply Vin and the series of ON-state resistance of the MOS transistors that are disposed in series which form the charging circuit.

However, in this condition, since the ON-state resistance of the PMOS transistor Q11 is high, an inverting electric power that is necessary for the output Vout cannot be obtained. Therefore, as it has already been described, by using the time-series control signal that has a fixed delay, the second charge-control signal TC2 is created, and in the charging circuit, the combined ON-state resistance is reduced by connecting the PMOS transistor Q12 that has the second highest ON-state resistance, in parallel with the PMOS transistor Q11. By doing so, the inverting electric power supply that is supplied to the output Vout increases to become the inverting power supply that is necessary.

Further, by using the time-series control signal S3 that has a fixed delay, a third charge-control signal TC3 is created, and in the charging circuit, the combined ON-state resistance is reduced (to approximately 1 ohm) by connecting the PMOS transistor Q13 that has the third highest ON-state resistance, in parallel with the PMOS transistors Q11 and Q12. This condition is maintained from here onward. Because of this, the inverting electric power that is necessary for the output Vout is supplied.

Thus, according to the fourth embodiment, in the basic structure of the inverting charge pump circuit, out of two MOS transistors that perform the charging operation, an MOS transistor on the side of the input power supply is formed by the three parallel connected MOS transistors. In other words, a structure is formed such that the corresponding MOS transistor in the basic structure is divided into three parts, and introduced in the charging circuit in time series in the descending order from the one that has the high ON-state resistance.

Therefore, it is possible to limit the rush current and to obtain the desired output voltage by using a type of the basic structure of the inverting charge pump circuit. Since there is no need to add a new circuit such as a circuit to pre-charge the capacitor or an auxiliary switch, the scale of the circuit can be made smaller.

Figure 7:
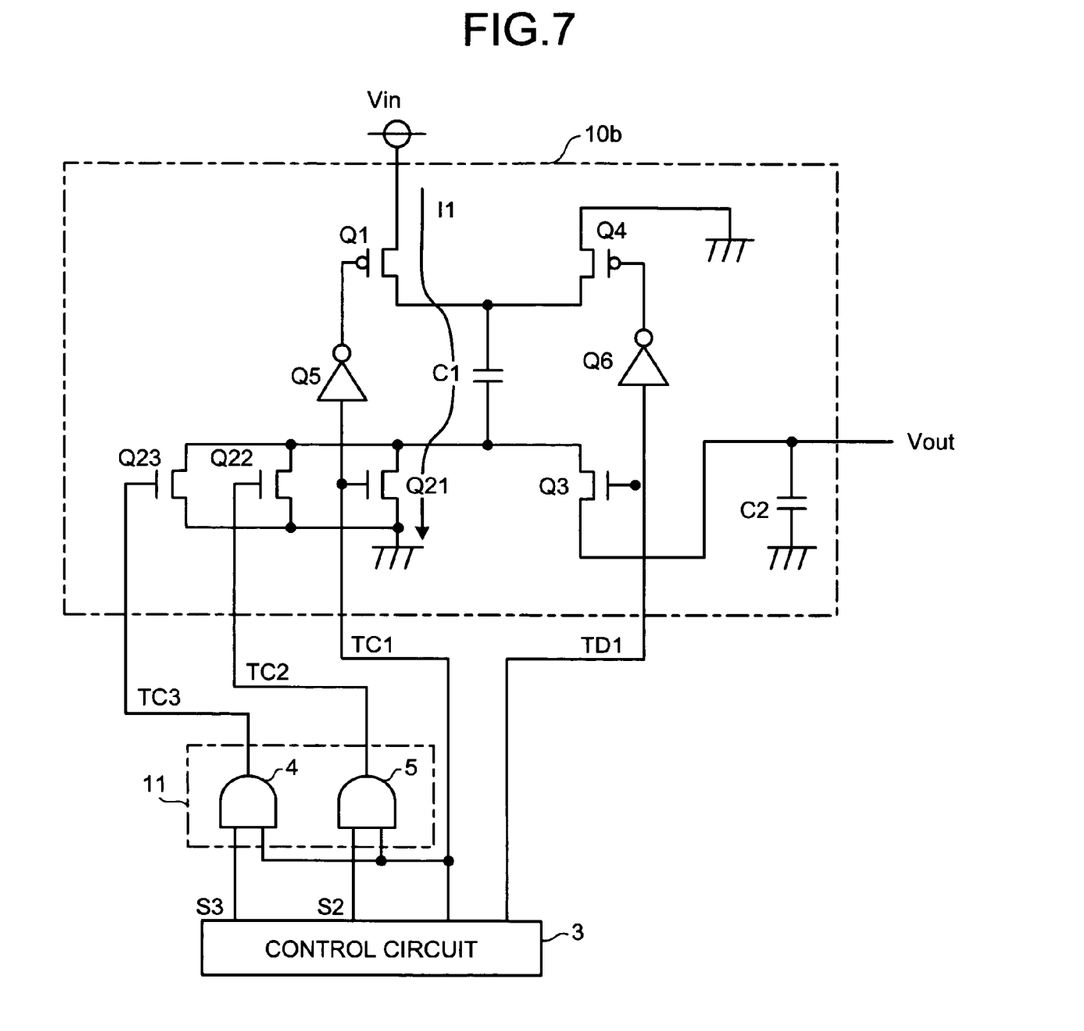
FIG. 7 is a circuit diagram of a charge pump power supply circuit (inverting circuit) according to a fifth embodiment of the present invention.

FIG. 7 is a circuit diagram of a charge pump power supply circuit (inverting circuit) according to a fifth embodiment of the present invention. As shown in FIG. 7, in a basic circuit 10b of the inverting circuit, the source electrode of the PMOS transistor Q1 is connected to the input power supply Vin and the drain electrode of the PMOS transistor Q1 is connected to the one of the electrodes of the flying capacitor C1. The drain electrode of each of the three parallel connected NMOS transistors Q21, Q22, and Q23 is connected to the other electrode of the flying capacitor C1, and the source electrode of each of the NMOS transistors Q21, Q22, and Q23 is grounded.

Moreover, the drain electrode of the NMOS transistor Q3 is connected to the other electrode of the flying capacitor C1, and the output capacitor C2 is disposed between the source electrode of the NMOS transistor Q3 and the ground. The drain electrode of the PMOS transistor Q4 is connected to the one of the electrodes of the flying capacitor C1, and the source electrode of the PMOS transistor Q4 is grounded.

Further, the charge-control signal TC1 that is generated by the control circuit 3 is applied directly to the gate electrode of the NMOS transistor Q21 and applied to the gate electrode of the PMOS transistor Q1 via the inverter Q5. Moreover, the discharge-control signal TD1 that is generated by the control circuit 3 is applied directly to the gate electrode of the NMOS transistor Q3 and applied to the gate electrode of the PMOS transistor Q4 via the inverter Q6.

In the distribution circuit 11, similarly as according to the fourth embodiment, the charge-control signals TC2 and TC3 are generated. The charge-control signal TC2 is applied to the gate electrode of the NMOS transistor Q22. Moreover, the charge-control signal TC3 is applied to the gate electrode of the NMOS transistor Q23.

Thus, in the basic circuit 10b, in a basic structure of the inverting charge pump circuit, out of two MOS transistors, which perform the charging operation, a PMOS transistor on the side of the input power supply Vin is formed by one PMOS transistor Q1 as in the basic structure, and an NMOS transistor on the ground side is formed by the NMOS transistors Q21, Q22, and Q23.

Thus, in the basic circuit 10b, in a basic structure of the inverting charge pump circuit, out of two MOS transistors, which perform the charging operation, an NMOS transistor on the side of the input power supply Vin is formed by one PMOS transistor Q1 as in the basic structure, and an NMOS transistor on the ground side is formed by the NMOS transistors Q21, Q22, and Q23.

In this case, the combined ON-state resistance of the three NMOS transistors Q21, Q22, and Q23 is equal to an ON-state resistance (approximately 1 ohm) of a corresponding one MOS transistor in the charging circuit in the basic structure of the inverting charge pump circuit. The correlation between the ON-state resistances of the NMOS transistors Q21, Q22, and Q23 is Q21>Q22>Q23.

Even in this structure, similarly as according to the fourth embodiment (FIG. 6), immediately after the power supply start up, since the NMOS transistor Q21 that has the highest ON-state resistance is introduced in the charging circuit, the rush current is limited. Then, when the predetermined time is elapsed, the NMOS transistor Q22 that has the second highest ON-state resistance is introduced additionally. Again when the predetermined time is elapsed, the NMOS transistor Q23 that has the third highest ON-state resistance is introduced additionally, and this condition is maintained from here onward. Thus, the inverted electric power that is necessary for the output Vout is obtained.

Thus, according to the fifth embodiment, in the basic structure of the inverting charge pump circuit, an MOS transistor on the ground side out of two MOS transistors that perform the charging operation is formed by three parallel connected MOS transistors. In other words, a structure is formed such that the corresponding MOS transistor in the basic structure is divided into three parts, and introduced in the charging circuit in time series in the descending order from the one that has the high ON-state resistance.

Therefore, it is possible to limit the rush current and to obtain the desired output voltage by a type of the basic structure of the inverting charge pump circuit. Since there is no need to add a new circuit such as a circuit to pre-charge the capacitor or an auxiliary switch, the scale of the circuit can be made smaller.

Figure 8:
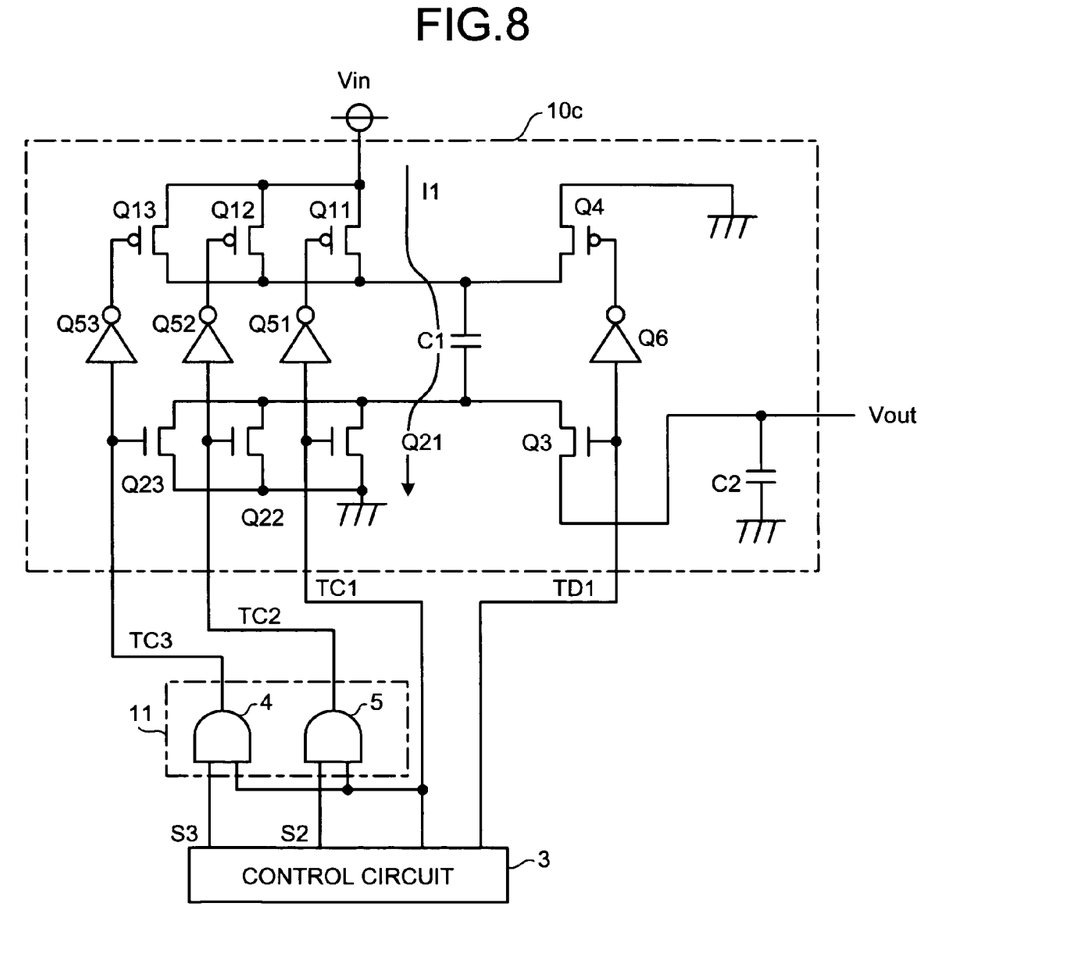
FIG. 8 is a circuit diagram of a charge pump power supply circuit (inverting circuit) according to a sixth embodiment of the present invention.

FIG. 8 is a circuit diagram of a charge pump power supply circuit (inverting circuit) according to a sixth embodiment of the present invention. As shown in FIG. 8, in a charging circuit, in a basic circuit 10c of the inverting circuit, the source electrode of each of the three PMOS transistors Q11, Q12, and Q13 is connected to the input power supply Vin, and the drain electrode of each of the PMOS transistors Q11, Q12, and Q13 is connected to the one of the electrodes of the flying capacitor C1. The drain electrode of each of the NMOS transistors Q21, Q22, and Q23 is connected to the other electrode of the flying capacitor C1, and the source electrode of each of the NMOS transistor Q21, Q22, and Q23 is grounded.

Moreover, in a discharging circuit, the drain electrode of the NMOS transistor Q3 is connected to the other electrode of the flying capacitor C1, and the output capacitor C2 is disposed between the source electrode of the NMOS transistor Q3 and the ground. The drain electrode of the PMOS transistor Q4 is connected to the one of the electrodes of the flying capacitor C1 and the source electrode of the PMOS transistor Q4 is grounded.

Further, the charge-control signal TC1 that is generated by the control circuit 3 is applied directly to the gate electrode of the NMOS transistor Q21 and applied to the gate electrode of the PMOS transistor Q11 via the inverter Q51. Moreover, the discharge control signal TD1 that is generated by the control circuit 3 is applied directly to the gate electrode of the NMOS transistor Q3, as well as applied to the gate electrode of the PMOS transistor Q4 via the inverter Q6.

In the distribution circuit 11, similarly as according to the fourth embodiment, the charge-control signals TC2 and TC3 are generated. The charge-control signal TC2 is applied directly to the gate electrode of the NMOS transistor Q22 and applied to the gate electrode of the PMOS transistor Q12 via the inverter Q52. Moreover, the charge-control signal TC3 is applied directly to the gate electrode of the NMOS transistor Q23 and applied to the gate electrode of the PMOS transistor Q13 via the inverter Q53.

Thus, in the basic circuit 10c, in a basic structure of the inverting charge pump circuit, out of two MOS transistors, which perform the charging operation, a MOS transistor on the side of the input power supply Vin is formed by the PMOS transistors Q11, Q12, and Q13, and an MOS transistor on the ground side is formed by the NMOS transistors Q21, Q22, and Q23.

In this case, the combined ON-state resistance of the three PMOS transistors Q11, Q12, and Q13 is equal to an ON-state resistance (approximately 1 ohm) of a corresponding one PMOS transistor in the charging circuit in the basic structure of the inverting charge pump circuit. The correlation between the ON-state resistances of the NMOS transistors Q11, Q12, and Q13 is Q11>Q12>Q13.

Moreover, the combined ON-state resistance of the NMOS transistors Q21, Q22, and Q23 is equal to an ON-state resistance (approximately 1 ohm) of a corresponding one NMOS transistor in the charging circuit in the basic structure of the inverting charge pump circuit. The correlation between the ON-state resistances of the three NMOS transistors Q21, Q22, and Q23 is Q21>Q22>Q23.

Even in this structure, similarly as according to the fourth embodiment (FIG. 6), immediately after the power supply start up, since the NMOS transistor Q21, and the PMOS transistor Q11 that has the highest ON-state resistance, are introduced in the charging circuit, the rush current is limited. Then, when the predetermined time is elapsed, the NMOS transistor Q22 and the PMOS transistor Q12 that has the second highest ON-state resistance are introduced additionally. Again when the predetermined time is elapsed, the NMOS transistor Q23, and the PMOS transistor Q13 that has the third highest ON-state resistance are introduced additionally, and this condition is maintained from here onward. Thus, the inverted electric power that is necessary for the output Vout is obtained.

Thus, according to the sixth embodiment, in the basic structure of the inverting charge pump circuit, each of the two MOS transistors that perform the charging operation is formed by three parallel connected MOS transistors. In other words, a structure is formed such that the two MOS transistors that form the charging circuit in the basic structure are divided into three parts, and introduced in the charging circuit in time series in the descending order from the one that has the high ON-state resistance.

Therefore, it is possible to limit the rush current and to obtain the desired output voltage by a type of the basic structure of the inverting charge pump circuit. Since there is no need to add a new circuit such as a circuit to pre-charge the capacitor or an auxiliary switch, the scale of the circuit can be made smaller.

According to the first to the sixth embodiments, the MOS transistors of different ON-state resistances have been employed; however, MOS transistors of the same ON-state resistance can be used instead. When the MOS transistors have same ON-state resistances, the MOS transistors may be caused to perform the ON operation in any order.

The case in which the combined ON-state resistance of all the MOS on the input side of the MOS transistors for charging is equal to the combined ON-state resistance of all the transistors on the output side has been described. However, the combined ON-state resistance may be let to be different.

The control circuit that generates the operation cycles T1 to T3 may be let to control such that the operation cycle T1 is a long period and the operation cycle T3 is a short period.

According to the first to the sixth embodiments described so far, the description is based on the three parallel connected MOS transistors; however, the number of parallel connected MOS transistors can be any number not less than two. If two MOS transistors connected in parallel, although there is some deterioration of accuracy, the rush current can be limited in a similar manner.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge pump power supply circuit comprising:
   two charging units that perform an operation of charging a capacitor up to an input voltage, at least one of the two charging units includes a plurality of parallel connected MOS transistors;
   two boosting units that perform an operation of boosting by adding the input voltage to a charging voltage of the capacitor; and
   a drive unit that causes each of the MOS transistors to perform an ON operation such that all of the MOS transistors are ON at the end of a time series, wherein
   each of the MOS transistors has a different ON-state resistance, and
   the drive unit causes the MOS transistors to perform the ON operation in a descending order from a MOS transistor that has the highest ON-state resistance.

2. The charge pump power supply circuit according to claim 1, combined ON-state resistances of both the charging units are equal.

3. The charge pump power supply circuit according to claim 1, combined ON-state resistances of both the boosting units are equal.

4. A charge pump power supply circuit comprising:
   two charging units that perform an operation of charging a capacitor up to an input voltage;
   two boosting units that perform an operation of boosting by adding the input voltage to a charging voltage of the capacitor, at least one of the two boosting units includes a plurality of parallel connected MOS transistors; and
   a drive unit that causes each of the MOS transistors to perform an ON operation such that all of the MOS transistors are ON at the end of a time series, wherein
   each of the MOS transistors has a different ON-state resistance, and
   the drive unit causes the MOS transistors to perform the ON operation in a descending order from a MOS transistor that has the highest ON-state resistance.

5. The charge pump power supply circuit according to claim 4, combined ON-state resistances of both the charging units are equal.

6. The charge pump power supply circuit according to claim 4, combined ON-state resistances of both the boosting units are equal.

7. A charge pump power supply circuit comprising:
   two charging units that perform an operation of charging a capacitor up to an input voltage, at least one of the two charging units includes a plurality of parallel connected MOS transistors;
   two inverting units that perform an operation of inverting the voltage stored in the capacitor and outputting the inverted voltage; and
   a drive unit that causes each of the MOS transistors to perform an ON operation such that all of the MOS transistors are ON at the end of a time series, wherein
   each of the MOS transistors has a different ON-state resistance, and
   the drive unit causes the MOS transistors to perform the ON operation in a descending order from a MOS transistor that has the highest ON-state resistance.

8. The charge pump power supply circuit according to claim 7, combined ON-state resistances of both the charging units are equal.

9. The charge pump power supply circuit according to claim 7, combined ON-state resistances of both the inverting units are equal.

* * * * *